United States Patent [19]

Spagnoli

[11] 4,440,265

[45] Apr. 3, 1984

[54] HYDRO-PNEUMATIC POSITIONER FOR REMOVAL/OR INSTALLATION OF WING ENGINES OF AIRCRAFTS AND THE LIKE

[75] Inventor: Giulio Spagnoli, Rome, Italy

[73] Assignee: Alitalia Linee Aeree Italiane S.p.A., Italy

[21] Appl. No.: 356,522

[22] Filed: Mar. 9, 1982

[30] Foreign Application Priority Data

May 22, 1981 [IT] Italy ................................ 48524 A/81

[51] Int. Cl.³ .............................................. B25J 5/00
[52] U.S. Cl. .................................... 182/129; 414/589; 187/8.59; 182/141
[58] Field of Search ................. 182/129, 141; 414/589; 187/8.59, 8.41, 8.65, 8.77; 254/89 H, 93 R

[56] References Cited

U.S. PATENT DOCUMENTS

| | | | |
|---|---|---|---|
| 1,710,442 | 4/1929 | Warshaw | 187/8.59 |
| 2,867,334 | 1/1959 | Aiken | 414/589 |
| 2,896,909 | 7/1959 | Taylor | 414/589 |
| 2,928,558 | 3/1960 | Bamford | 414/589 |
| 2,931,519 | 3/1960 | Beach | 414/589 |
| 3,117,652 | 1/1964 | Wallace | 187/8.59 |
| 3,150,784 | 9/1964 | Rothe | 254/89 H |
| 3,415,342 | 12/1968 | Hott | 187/8.41 |
| 3,524,556 | 8/1970 | Miller | 414/589 |
| 4,029,218 | 6/1977 | Matsuura | 187/8.41 |
| 4,288,193 | 9/1981 | Klausbruckner | 414/589 |

Primary Examiner—R. P. Machado
Assistant Examiner—Alvin Chin-Shue
Attorney, Agent, or Firm—Wigman & Cohen

[57] ABSTRACT

A hydro-pneumatic positioner for a trailer for the support and transport of a wing engine, to be used for the removal/or installation of the wing engines of aircrafts or the like, comprising a basic structure fixed to four air-cushion devices, and supporting, by means of four hydraulic lifting cylinders or jacks and hoisting chains, a frame for the support of the trailer and of the engine. The front cylinders of said hydraulic cylinders are fixed to the basic structure, while the rear cylinders can be selectively simultaneously brought and held in vertical position, or turned over to contact the ground by means of a third pair of double-acting hydraulic cylinders or jacks. The basic structure also houses or supports: the hydraulic and pneumatic devices for the actuation of the positioner mechanisms; the adjustment devices for control means and protection means; and at least one air supply pipe to be connected to an external compressed air source.

7 Claims, 14 Drawing Figures

HYDRO-PNEUMATIC POSITIONER FOR REMOVAL/OR INSTALLATION OF WING ENGINES OF AIRCRAFTS AND THE LIKE

BACKGROUND OF THE INVENTION

The present invention relates to a hydro-pneumatic positioner for the support, transport and lifting or lowering of a trailer provided with a cradle, having special adapters for supporting a wing engine and to be used for the removal or installation of an engine, in particular, for aeroplanes of the types known under the names: Douglas D.C.10, Airbus A 300 or for other similar intended purposes.

Several systems and devices are already known for the installation or removal of wing engines. Said known systems present limited safety and low protection reliability for the operators using these systems.

The workers not only must work in uncomfortable positions in which they are hampered by the structures which are part of the equipment, but they also work under very high impending loads, so that wrong maneuvres and/or damages in the equipment can cause very serious accidents. The operations to be performed by the devices, known to date, are long, very fatiguing and require considerable preparatory operations before the installation or removal of an engine. These known systems become less and less acceptable, in particular, in airplane engines, with respect to the safety, since any wrong maneuvre can expose men and things to incalculable risks.

One such device is a bridge-crane used in conjunction with sling hooks. The use of such an equipment requires normally the previous removal of the whole engine cowling. Further the workers on the bridge crane and those who operate near the ground must cooperate together at a considerable distance from each other so that the maneuvres require much time and labour in order to be performed in a correct and strict perfect collaboration; they also cause high stress and fatigue in the interested personel. The removal or installation of the wing engines of the like present thus always a poor reliability in the attaining of perfect results; it requires much time and labor.

Another known device is based on the commonly called "Boot Strap System". This device does not require the removal of the engine cowls, because it is designed to operate from the underside of the engine, so that it requires only the use of a frame for holding in open position by means of supporting members, directly the pair of the two halves of the shell forming the central portion of each cowl, and indirectly the pairs of two shell halves forming the front and rear portions thereof.

For such a purpose to the pylon supporting the wing engine and which is integral with the wing, are fastened lateral hoists, the chains or ropes of which are hooked to connectors arranged on the engine body. After the wing engine has been duly provided with forward adapters and with a rear positioning pin and the respective mounting bolts have been removed, the hoists are manually operated from the lower side by the respective operators, who thus work still under the risk of an enormous impending load and who must also work with the maximum concentration so as to able to perfectly coordinate all their movements, meanwhile other operators provide to screw or unscrew the bolts and to direct the whole operation.

The installation is a particularly delicate operation, since, as it is well known to the persons skilled in the art, it is necessary to obtain the exact matching between the bolt holes arranged on the engine and those arranged on the pylon of the aircraft before the insertion and the screwing down of said mounting bolts, also taking in due consideration that the threaded holes of the rear bolts are provided on a rocking support member so that this operation becomes still more difficult to perform.

It also well known that when the mounting bolts are not screwed so as to come into perfect register with the hole axes, internal stresses can be generated which can promote the bolt breakage, which could also cause the disjunction of the engine from the pylon.

SUMMARY AND OBJECTS OF THE INVENTION

The present invention thus aims to provide an equipment capable of overcoming the aforementioned inconveniences and which also enables to reduce the time necessary for performing all the operations necessary for the substitution of a wing engine, as well as enabling to reduce the required labour, also increasing the personel safety, simplifying the required maneuvres and reducing the strains which the operators have to bear. This equipment enables the operators to more easily approach the work or control areas enabling them to work in better and safer conditions, with less physical efforts as well as with the best efficiency so that the ergonomic duty will be considerably improved.

The use of such a device yields quick and perfect results, without requiring the use of any auxiliary device for the lifting of persons or goods.

The present invention thus related to a hydro-pneumatic positioner for the support and the transport of a trailer provided with a cradle designed to support and receive a wing engine. This positioner will be brought by any transportation means near to the area where the airplane is parked, but said positioner can also selectively be supported by air cushions so that it can easily be pushed forward or back together with all what is carried thereon.

According to the present invention also provision is made to install on said trailer small disassemblable stepping platforms for the more safety and comfort of operators tending to the removal of the engine or to the installation of the new engine. Therefore these operators are let to ascend or descend together with the trailer so that they remain always in the best position for approaching the bolt holes arranged on the engine body and also for controlling the centering, with respect to the bolt holes arranged on the carrying structure of the aircraft, in particular, on the pylon designed to support said engine with the help of gauge pins.

This operation is performed after the cowl members, pivotally linked to said pylon, have been opened and raised by suitable devices which are not described since they do not pertain to this invention. The present invention, therefore, is based on the informing principle, totally unrecognized by the art, of using a special hydro-pneumatic positioner for the lifting of a trailer carrying a cradle for supporting the engine, or which is designed to receive the engine which has to be removed from the pylon, in order to enable to carry out all the operations of overhaul, maintenance or substitution of one or more parts thereof. This trailer is caused to be lifted together with the operators who have to accomplish the removal or the installation of the engine; then it is caused to be lowered by the positioner in order to enable that the trailer can be removed away from said positioner and to be towed towards the repair shop, in order to overhaul the engine, or towards a parking area, ready for a further employ, when the trailer has been used for the installation of an engine.

For such purposes the positioner comprises a strong basic structure provided with devices adapted to create four air cushions for the suspension thereof. Adjacent its corners are installed four hydraulic cylinders having vertical operative strokes. This basic structure, by mean of the four hydraulic cylinders and four hoisting chains, supports a frame designed to support the standard transportation trailer; the wheels of said trailer always remain positioned out of the longitudinal sides of the basic structure of the positioner.

Therefore, by operation of the apparatus and devices provided on the positioner, the transport, raising and lowering operations of the following assemblies can be accomplished:

(a) The frame supporting only the trailer with its cradle ready for receiving an engine; or
(b) the frame supporting the trailer which, in turn, supports an engine.

The pair of front hydraulic cylinders are fixed to the basic structure, while the rear ones can be overturned until they are in contact with the ground in alignment with the basic structure. Thus, the axles of the trailer or any lower part of the chassis thereof can be positioned just over the basic structure of the positioner with the frame in its lowermost position, while the trailer wheels can travel on the ground along the longitudinal sides of the positioner. Then said rear cylinders can be brought again in their vertical position, and the positioner is ready to become operative so as to lift the frame together with the trailer. The positioner together with the assembly carried thereon can be moved to the exact utilisation area and then it can raise the trailer to the required level.

For this purpose the positioner is provided with four devices adapted to create air cushions therebeneath. As these devices become operative they cause the positioner to be raised up to such a distance from the ground that the trailer wheels are separated from the ground. In this condition the assembly requires a minimum effort, which is of about 1/1000 of the total weight carried, to be moved and no effort at all, for lifting the engine during the removal installation phases. Thus this assembly can be brought in perfect alignment with the engine installation or removal areas. This effort can be about 10 kg. After attaining this position, the cradle is moved upwards, said frame now bearing the trailer on which there is, or will be placed, the engine, without requiring any effort of the operators, but only by means of the hydraulic cylinders which are actuated by an oil pressure supplied by a pump driven by an air-driven motor. Under the control of the operators, mounted on the stepping platforms of the trailer, the exact positioning of the assembly can be then obtained by means of short horizontal fine adjustment movements of the assembly, which are made easier since the positioner now rests on air cushions.

The feeding of air to the devices inflating the air cushions is shut-off and the positioner together with what is carried thereon is lower to the ground; thence the frame is caused to be raised by supplying the fluid to the hydraulic cylinders by means of the motor-driven pump. At last a fine adjustment of the trailer height is performed by feeding the fluid to the cylinders under the control of manually-driven pumps during the final phase of the positioning of the engine, in the case of installation, or only of the cradle of the trailer designed to receive the engine, in the case of engine removal, in order that the trailer can be set in the correct position for receiving the engine being removed. The exact positioning can be now easily controlled with accuracy by the same operators which are mounted on the stepping platforms installed on the trailer.

BRIEF DESCRIPTION OF THE DRAWINGS

These and other objects, characteristics and advantages of the hydro-pneumatic positioner, according to the present invention, will be better understood by the following description of an embodiment of this invention taking in consideration the accompanying drawings, in which.

DETAILED DESCRIPTION OF A PREFERRED EMBODIMENT

Figure 1:
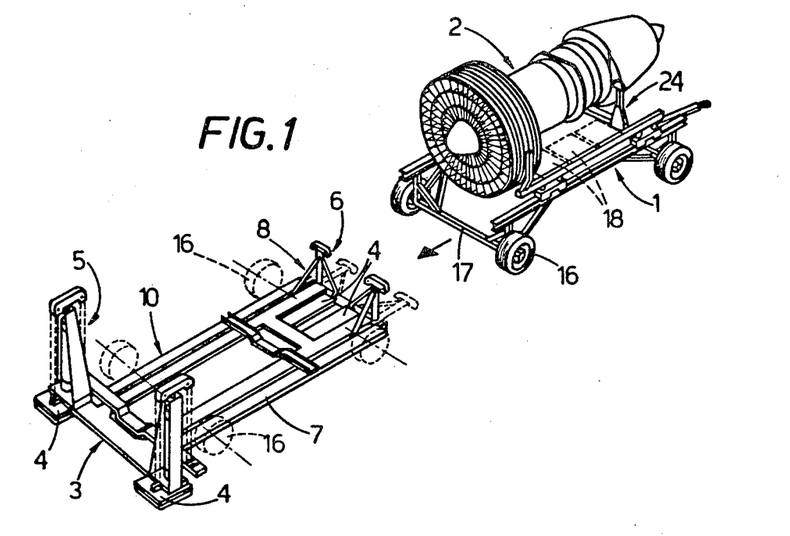
FIG. 1 is a diagrammatic simplified perspective view of the equipment of this invention.

Now referring to the drawings and more in particular to FIG. 1, the equipment for the installation or removal of a wing engine of an aircraft, in particular, an airplane of the type D.C.10, or A 300 or for other similar purposes, requires a transportation trailer, generally indicated 1, having a steel chassis mounted on four wheels 16 and designed to support, by means of the adapters 24, an engine, generally marked 2, which has been removed or which as to be installed on an airplane. Each wing engine of airplanes of the aforementioned types is provided with a cowl, the front end portion of which consists of a single body, while the central and the rear parts constitute of three pairs of curved plates, each shaped in the form of a half-shell or valve. Said shells are pivotally linked to the pylon carrying the engine 2 and during the installation or removal operations they must be maintained in their raised positions by suitably known devices. The trailer 1 comprising a steel chassis on which is mounted a cradle 24 is well known in its operative structure, but for the present purpose is equipped, according to the present invention, with the work stepping platforms 18, preferably mounted in a disassemblable manner, which improve the accessibility of the operators to the engine 2, during the removal or installation phases.

The equipment further comprises the hydropneumatic positioner, generally indicated 10, comprising of a basic structure, generally marked 3, which has two pairs of hydraulic cylinders or jacks 5 and 6, that operating in operate in the vertical direction and are connected to four hoisting chains 9. A frame 7 is designed, in turn, to support, raise and lower the trailer 1 provided with a support cradle 24 which carries or which will carry the engine 2. In order to allow the installation of the trailer 1 over the basic structure 3 of the positioner 10, this latter has its central and rear portions of a width less than the distance between the inner side surfaces of the trailer wheels 16. The rear hydraulic cylinders 6 can be overturned until they come into contact with the ground, in alignment with the basic structure 3, so that the trailer 1, together with or without an engine 2 mounted thereon, can be brought just over the basic structure 3 as well as over the frame 7 in its lowermost level. The trailer 1 travels along the ground supported by its wheels 16 which move on the ground near the longitudinal sides of the positioner 10. The hydraulic cylinders 6 can be overturned until they come into contact with the ground or can be brought again in their vertical position by a third pair of hydraulic cylinders 8, of a double-acting type, which cause cylinders 6 to be brought in unison to their horizontal position and then, when the trailer 1 has reached its correct position over the basic structure 3 and the frame 7, to raise the hydraulic cylinders 6 up to their vertical position, ready to be brought in action.

Figure 2:
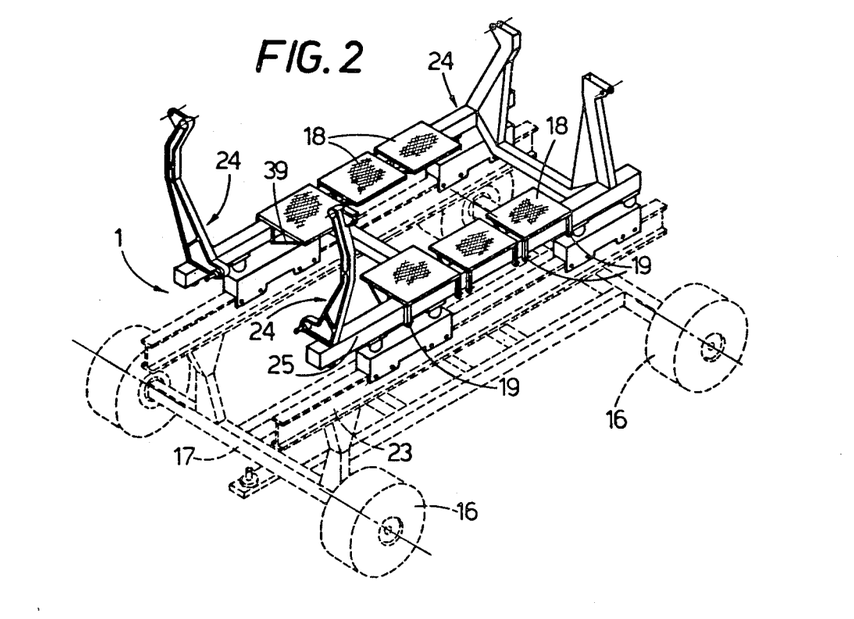
FIG. 2 is a diagrammatic simplified perspective view of the trailer with its cradle bearing the work stepping platforms.
Figure 3:
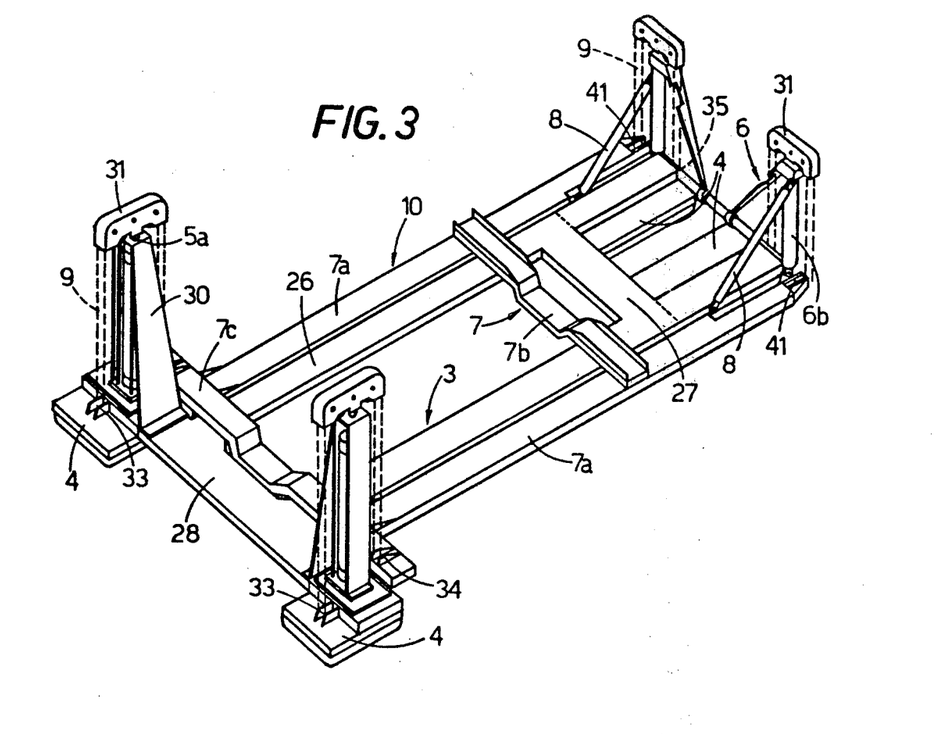
FIG. 3 is a somewhat schematic perspective view of the positioner taken from above.
Figure 7:
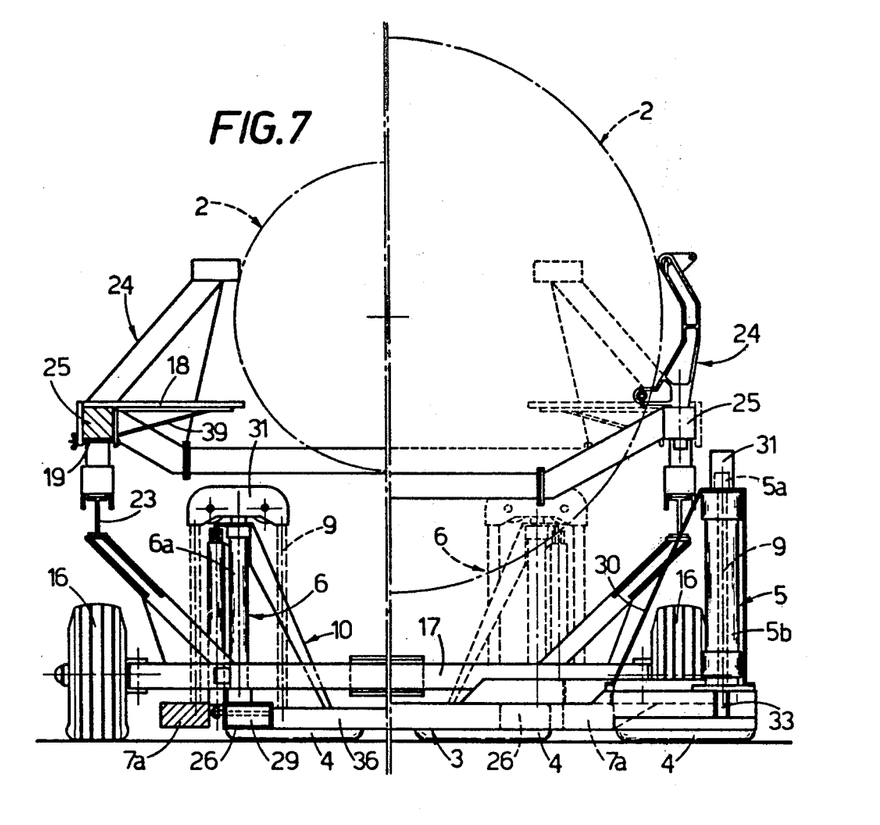
FIG. 7, at one half thereof, shows the cross section of the assembly of FIG. 5 taken on the line A—A thereof, while the other half shows the front view of said assembly.
Figures 8, 9:
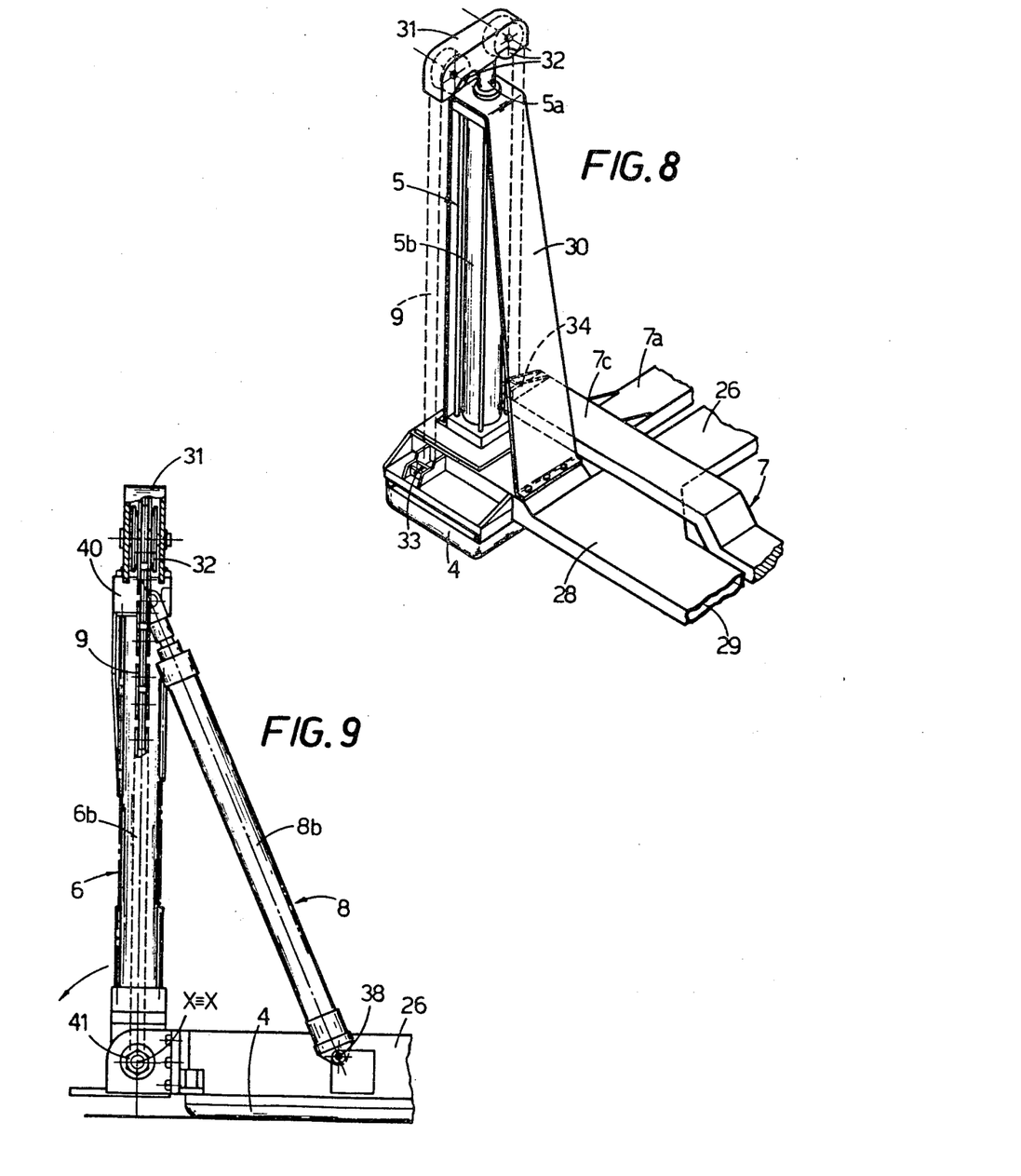
FIG. 8 shows a perspective view of one of the fixed front hydraulic cylinders.
FIG. 9 shows the side view taken on the line B—B of FIG. 10.

Under the corners of the basic structure 3 are arranged devices 4 which are "per se" well known and which are designed to create under the bottom side of the structure 3 four air cushions having a sufficient power for lifting upwards the positioner 10 from the ground, together with the trailer 1, and the engine 2. The trailer 1 now rests on the frame 7 by means of its axles 17, while the wheels 16 remain hanging from the chassis of the trailer 1, on which a cradle 24 is mounted supporting a set of work stepping platforms 18, preferably installed, in a removable manner, by means of quick connecting pins 19 adapted to disconnectably connect said platforms 18 to the cradle 24. These platforms are designed to support the operators which have to perform the removal or installation of the engine 2, so that the operators can ascend or descend together with the trailer 1 and the cradle 24 mounted thereon (FIGS. 2 and 7). In order to better understand the present invention, it will now be described.

To install an engine 2 on an aircraft, the engine 2 (FIG. 1) is drawn from the repair shop or from its parking area, already mounted on a transportation trailer 1, which houses said engine 2 by means of the cradle 24. The trailer 1 is towed to the area in which the engine 2 has to be installed by any suitable towing means.

In this area the positioner 10 is connected to any suitable pneumatic source. The rear hydraulic cylinders 6 are then overturned until they come into contact with the ground (dotted position shown in FIG. 1). In this condition of the positioner 10, the trailer 1 can be moved so as to be positioned just over the basic structure 3 of said positioner 10, said trailer 1 being stopped just before coming in contact with the front hydraulic cylinders 5. Afterwards the cylinders 6 are returned to their vertical position by hydraulic control cylinders 8. Then the devices 4 which create the air cushions become operative; raising the positioner 10 from the ground to obtain such a distance so that the trailer 1 together with the engine 2 are supported by the positioner 10 with a clearance between the ground and the wheels 16 of about 2 cm. In this condition this assembly can be moved in any direction with a very small effort so as to be positioned exactly in the area, where the engine 2 has to be installed. Then, the hydraulic cylinders 5 and 6 are operated in unison, which lift the frame 7 upward together with the trailer 1 and the engine 2 carried thereon.

On each side of the cradle 24 of the trailer 1, work stepping platforms 18 have been previously installed, the largest ones near the engine fan section, on which the operators can stand and get raised together with the trailer. The hydraulic cylinders 5 and 6, by means of the chains 9, raise the frame 7 together with the trailer 1 carrying the cradle 24 on which the engine 2 and the operators are located. The operators will be always positioned just at the suitable height and position so as to be able to travel and change their place with safety along the platforms 18 so as to be able to control the correct positioning of the engine 2 with respect to the aircraft and so as to be able to give instructions to the operators on the ground who in turn control the positioner 10, and who work under conditions of nearly absolute safety. The first phase of the lifting maneuvre will be actuated by supplying oil to the cylinders 5 and 6 by a rotary pump 14 driven by a compressed-air motor 13. The the last fine adjustment of the height will be performed, after the devices 4 have been made inoperative and supplying after the oil to each of the cylinders 5 and 6, in an independent manner, by means of the manually driven pumps 15a, 15b and 15c, designed to feed the oil to said cylinders 5 and 6 more slowly, in parallel with the oil circuit which receives the oil fed by the pump 14. These devices will be better described subsequently, when all the component devices of the equipment will be described in more detailed manner.

The removal of the engine 2 is carried out according to a similar but inverted maneuvre sequence of operations with changes which can be easily realized by any person skilled in the art.

After having generically described the way of operating the equipment of the present invention, a more exhaustive and detailed description of the characteristics of each of the main components of the equipment will now be given.

Figure 4:
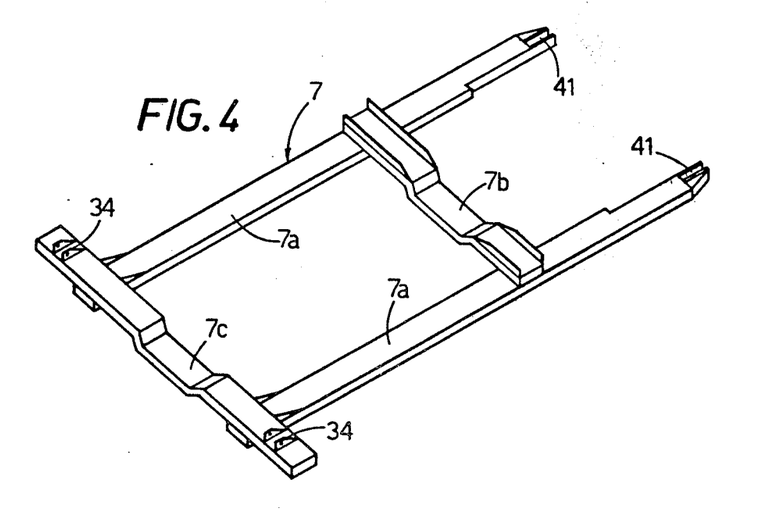
FIG. 4 is a perspective view of the frame.
Figure 5:
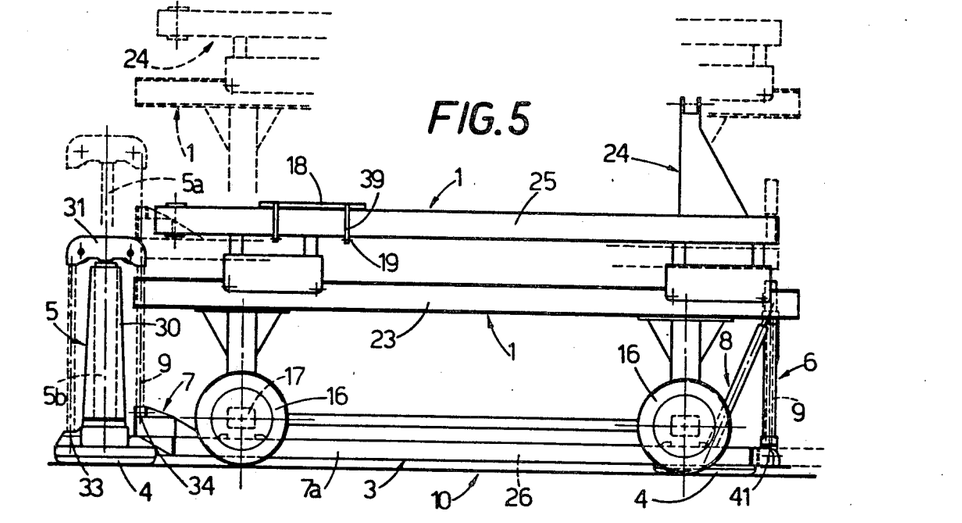
FIG. 5 shows the view of a longitudinal side of the positioner.

The trailer 1, as has been already aforesaid described comprises a known metal carrying structure or chassis comprising side frame members 23 supporting the axles 17, at the ends of which are rotatably mounted the wheels 16. Upon the side frame members 23 is mounted a cradle 24 having the shape of an inverted saddle, comprising shaped brackets and beam bearings for supporting the engine 2 so as to prevent any displacement thereof (FIGS. 2 and 7). The cradle 24 comprises longitudinal beams 25 to which are fixed by means of disconnectable locking devices, such as quick connecting pins 19, work stepping platforms 18 (FIGS. 2, 5 and 7). These extend innerwardly from the cradle 24 to the space designed to receive the engine 2, in particular, near the central portion thereof where there are the bolt holes provided to receive the bolts which serve to fixedly connect the engine 2 to the support pylon of the aircraft, entering coaxial bolt holes arranged on said pylon. In this way the operators, mounted on the platforms 18, are always in the best, more comfortable and safe conditions so as to control the correct positioning of all the installation or removal operations of an engine 2, so that, when such a correct positioning has been achieved, they can insert the mounting bolts, or remove them. Each platform 18 is made of a square tubular frame 39, covered with an aluminium alloy anti-skid plate. The mounting upon the side beams 25 is made by means of quick connecting pins 19. The largest of the platforms 18 shall be mounted near the engine fan section. As has been afore mentioned already, the positioner 10 consists of a lower basic structure 3 and of a frame 7 mounted thereon. The main portion of the basic structure 3 (FIGS. 3 to 7) and 14) consists of two longitudinal hollow beams 26 and of an intermediate rear hollow cross beam 27, while the front end portions of the beams 26 are connected to one another by a front hollow cross beam 28 which is longer than the width of the central and rear portions of the basic structure 3. The hollow means 26, 27 and 28 of the basic structure 3 are connected hermetically to each other and have inner intercommunicating cavities which define, in combination, an inner chamber 29 (FIG. 11) which provide a reserve of the compressed air which will be used for feeding the air cushion devices 4 of the positioner 10, as will be hereinafter described.

Figure 6:
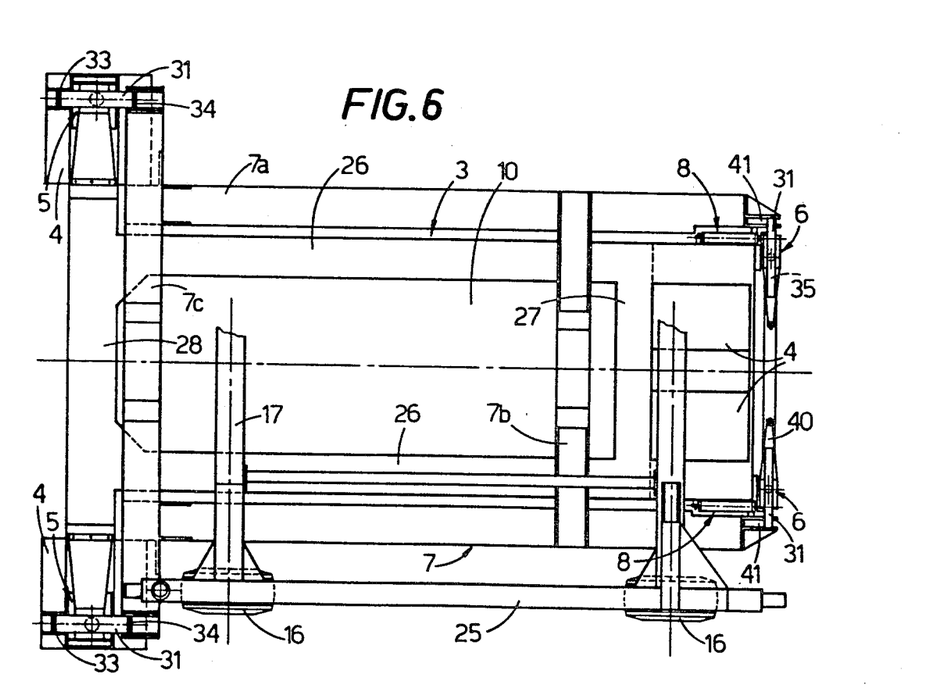
FIG. 6 is a plan view of the positioner respectively, when the trailer has been inserted over the basic structure of the positioner, said trailer being only partially represented.
Figure 10:
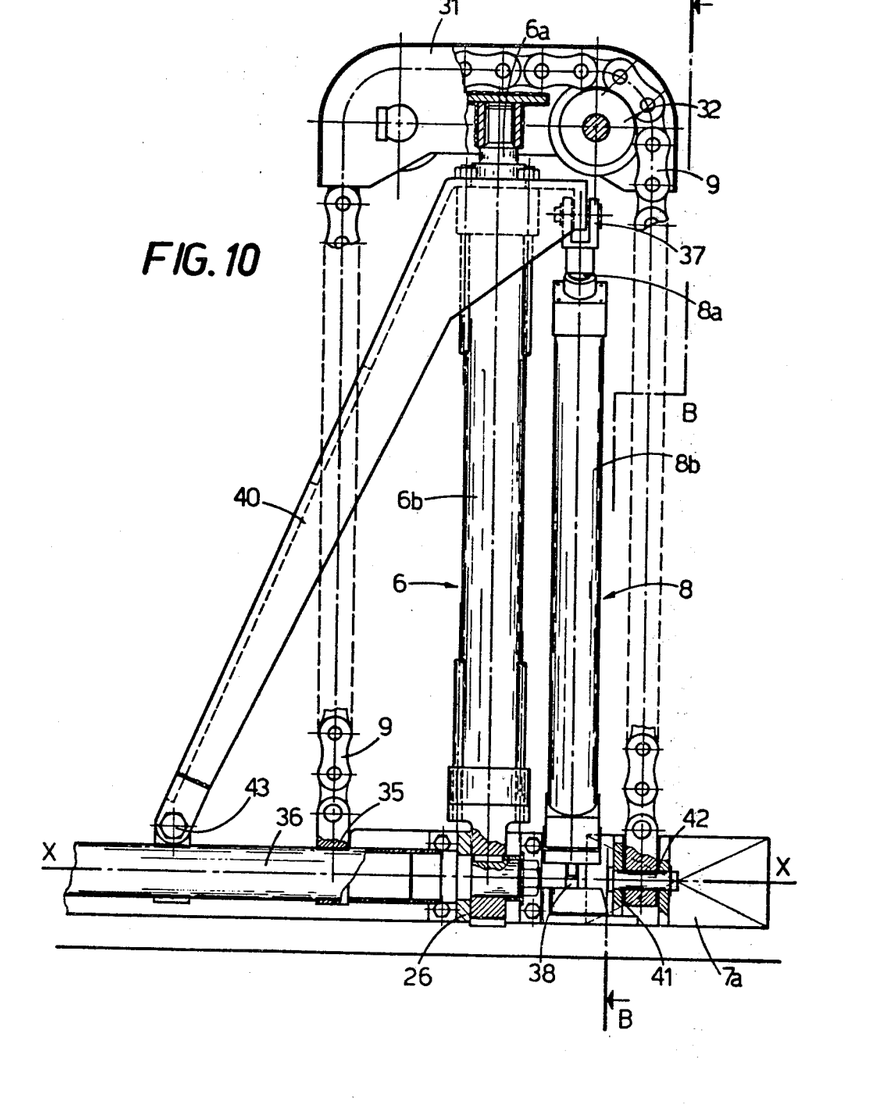
FIG. 10 shows the rearward view, with one of the rear hydraulic cylinders partly broken away.

The basic structure 3 has thus in plan a substantially TT shape and near its outer corners and underneath thereof are mounted the devices 4 for creating air cushions adapted to raise the positioner 10 away from the ground, together with what is mounted thereon, up to a predetermined distance, during some phase of the utilisation thereof. Of course, it will be required that the ground or floor on which the positioner 10 shall work must be well smooth, non porous, clean from dirty material or any protruding objects and without any cracks, or the operating surfaces must be covered with a thin-gage sheet metal or other suitable laminar material such as a carpet made of plastics with a substrate like linoleum. Near the outer corners of the basic structure 3 are mounted the hydraulic cylinders 5 and 6 having operative vertical strokes. The hydraulic cylinders 5 are fixed because the piston cylinders 5b are fixedly connected to the basic structure 3 also by means of strong propping bars 30. The piston rods 5a actuated by the inner pistons of the cylinders 5 are each made integral with a protection cover 31 shaped as a channel, the inner cavity of which facing downwards houses two transmission guiding rollers 32 for a chain 9 which travels on a longitudinal plane with respect to the basic structure 3. The chain 9 associated with each hydraulic cylinder 5 is anchored at one of its ends to a connection 33 of the basic structure 3 and at the other to a connection 34 arranged on the frame 7 (FIGS. 4 and 6). The frame 7 is formed by two longitudinal beams 7a spaced apart from one another so as to allow said beams 7a to be located along the outer sides of the longitudinal beams 26, said beams 7a being bridged to one another by an intermediate cross beam 7b positioned near the rear end of the frame 7, and by a front cross beam 7c, the ends of this latter extending outwardly beyond the longitudinal beams 7a and being provided with the said connections 34. Of course, the cross beams 7b and 7c are mounted on the longitudinal beams 7a. The rear hydraulic cylinders 6 are operatively identical to the hydraulic cylinders 5, but their chains 9 travel in a transverse plane with respect to the basic structure 3. Also the piston rods 6a are made integral with a channel-like protection cover 31, in the inner cavity of which are rotatably mounted transmission guiding rollers 32 for the respective chains 9, which are anchored at one end by means of a sleeve 35 to a transverse rod 36 (FIG. 10) which is made integral with the piston cylinders 6b of the rear hydraulic cylinders 6. Thus these latter can rotate in unison about the horizontal axis X—X of the rod 36 which is parallel to the transverse beams 27 and 28. The other end of the chains 9, which cooperate with the hydraulic cylinders 6, is respectively connected by means of a transverse pin 42 to the connections 41 arranged on the rear ends of the longitudinal beams 7a of the cradle 7. Close to the upper ends of the cylinders 6b of the hydraulic cylinders 6, said piston cylinders 6a are connected to the piston rods 8a of the hydraulic cylinders 8, while the lower end of the piston cylinders 8b of the hydraulic cylinders 8 are pivotally linked at 38 to the longitudinal beams 26. The piston cylinders 6b of the hydraulic cylinders 6 are always held in parallel relationship to one another by inclined arms 40, each fixedly connected at its upper end to the upper head of the respective piston cylinder 6b, while at its lower end is made integral at 43 to the rod 36 so that the hydraulic cylinders 6, having the axes always parallel to one another and coplanar with the axis X—X, can rotate in unison about the axis X—X under the control of the hydraulic cylinders 8, the piston rods 8a of which are hinged at 37 to the upper ends of the respective arms 40.

The hydraulic cylinders 8 are of a double-acting type and their operative strokes are as long as to bring the hydraulic cylinders 6 from their vertical position, (shown in full lines in FIG. 1) to their horizontal position (shown in dotted lines in FIG. 1), in which they are positioned in contact with the ground and substantially in prosecution of the longitudinal beams 26 of the basic structure 3, the central and rear portions of which, together with the frame when brought in its lowermost position, must have in this position a height less than that of the lowermost portions of the axles 17 of the trailer 1, or of the lowermost parts of the chassis of the trailer 1 so that this latter can be freely moved over the frame 7 and the basic structure 3, advancing from the rear end of the positioner 10 (FIG. 1).

Figure 11:
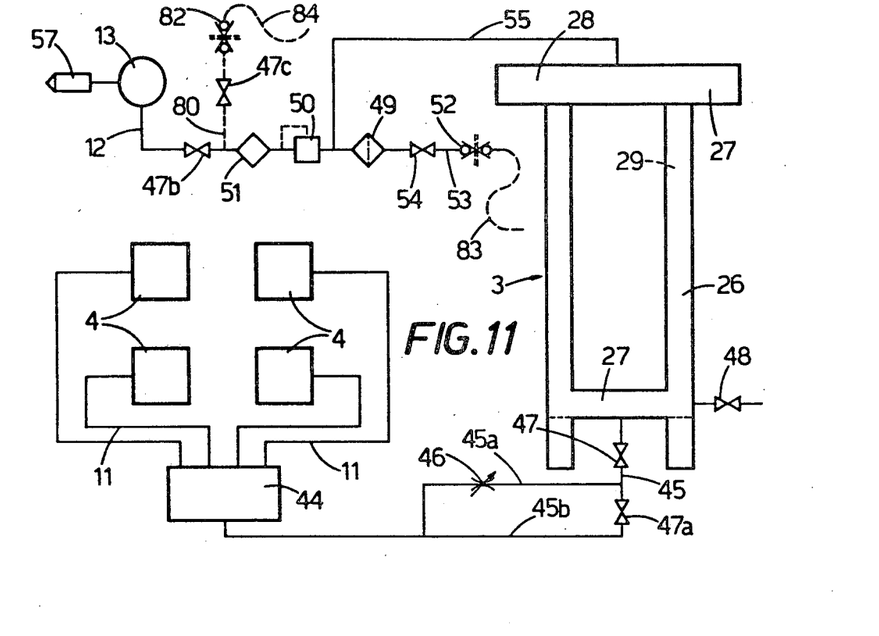
FIG. 11 shows a block diagram of the pneumatic system.

Now will be described the characteristics of the system for the actuation of the positioner 10 which utilizes the energy of the compressed air supplied by an external source by means of a hose 83 which is connected to the conduit 53 by means of a quick coupling 52 (FIG. 11). The compressed air is utilized to actuate the devices 4 so as to create air cushions for supporting the positioner 10 and all the goods or persons carried thereby, when required, as well as for the supply of the air to a compressed-air driven motor 13 which actuates the oil pump 14 feeding the hydraulic cylinders 5, 6 and 8.

Figure 12:
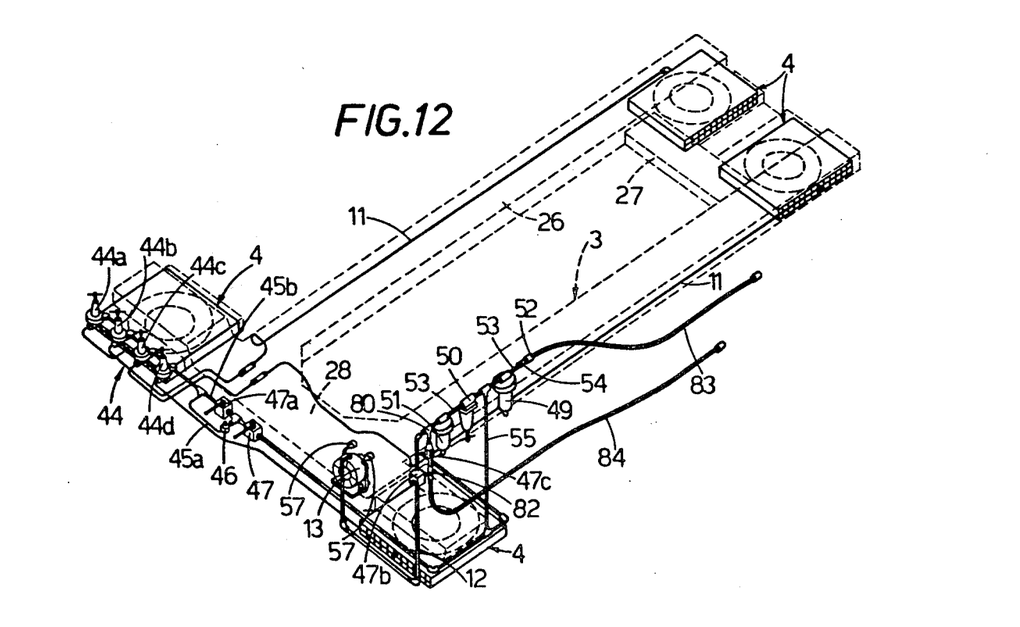
FIG. 12 is a perspective view of the flow circuitry of the system for supplying air to the air cushions.

First will be described the pneumatic system of the positioner 10, taking in consideration in particular the FIGS. 11 and 12. The devices 4 are fed by the compressed air supplied through the set of pipes 11 which are connected to an air cushion pressure regulating unit, indicated by the block 44 in the block diagram of FIG. 11, but which comprises single regulators 44a, 44b, 44c and 44d, each controlling one of the devices 4 (FIG. 12). The compressed air is supplied to the unit 44 through the pipe 45 controlled by a shut-off valve 37. Pipe 45 is branched off two pipes, i.e. the pipe 45a comprising an auxiliary flow regulator 46, and the pipe 45b including a shut-off valve 47a.

The compressed air passed through the pipe 45 is supplied through the pipe 55 which is branched off from the main feeding pipe 53 with the interposition of the chamber 29 obtained in the inside of the carrying frame of the basic structure 3, which, for such a purpose, includes the tubular beams 26, 27 and 28, the inner intercommunicating cavities of which form the chamber 29 which is air-tight closed with respect to the atmosphere, and is provided with a drain valve 48. Said chamber 29 acts as a compressed-air reserve in the pneumatic system, said reserve being of such an amount as to be sufficient for feeding the devices 4, at least partially and for a predetermined time, so that in the event of a breakage of the pipes which supply the compressed air to the chamber 29, or other similar accidents, the positioner 10 can be lowered slowly enough, without being subjected to any dangerous impact. For such a purpose must be calculated the volume of the chamber 29. The main feeding pipe 53 (FIG. 11) is connected by a quick coupling 52 to the hose 83, while upstream of the shut-off valve 54 is mounted an air filter 49, downstream of where the pipe 55 is branched off. In the pipe 53 are also inserted a main air pressure regulating valve 50 and a device 51 for lubricating the air. Then the pipe 53 is connected to the pipe 12 controlled by a shut-off valve 47b, said pipe 12 supplying the compressed air to the rotary motor 13 provided with muffler 57, said motor 13 driving the oil pump 14. By a dotted line is indicated a branched off pipe 80 controlled by the shut-off valve 47c, said pipe 80 ending with a quick coupling 82 for the connection with the hose 84 designed to supply compressed air to other apparatus working near the cooperatively associated with positioner 10, if needed. As the positioner 10 has the trailer 1, carrying the engine 2 or without any engine, positioned just thereover and it will be necessary to correctly position this assembly, the devices 4 are caused to become operative, previously adjusting the air pressure in function of the total weight of the assembly. Thus can be obtained air cushions which maintain the basic structure 3 suspended on the air in a substantially horizontal position, also under the foreseen maximum load. In this condition said basic structure 3 must be spaced away from the ground of such an extent, that the trailer wheels 16 can remain in suspended position along the outer sides of the longitudinal beams 7a of the frame 7, which now is in contact with the basic structure 3 and which in this condition supports the trailer 1 and also the engine 2, if an engine 2 had been previously mounted on said trailer 1. In this condition the assembly 10, 1, 24 and 2 can be easily manually pushed up to be positioned just underneath the pylon of the aircraft, in the correct spot in which the work has to be performed. Then the air supply to the devices 4 is cut by actuating the valves 47 and the operators get on the platforms 18; afterwards the hydraulic cylinders 5 and 6 are actuated. For such a purpose the valve 47b is opened, which controls the pipe 12, through which compressed air is supplied to the motor 13 by means of which the pump 14 is driven, so that all the hydraulic system is ready to be put in action, as has been shown in the block diagram of FIG. 13.

Figure 13:
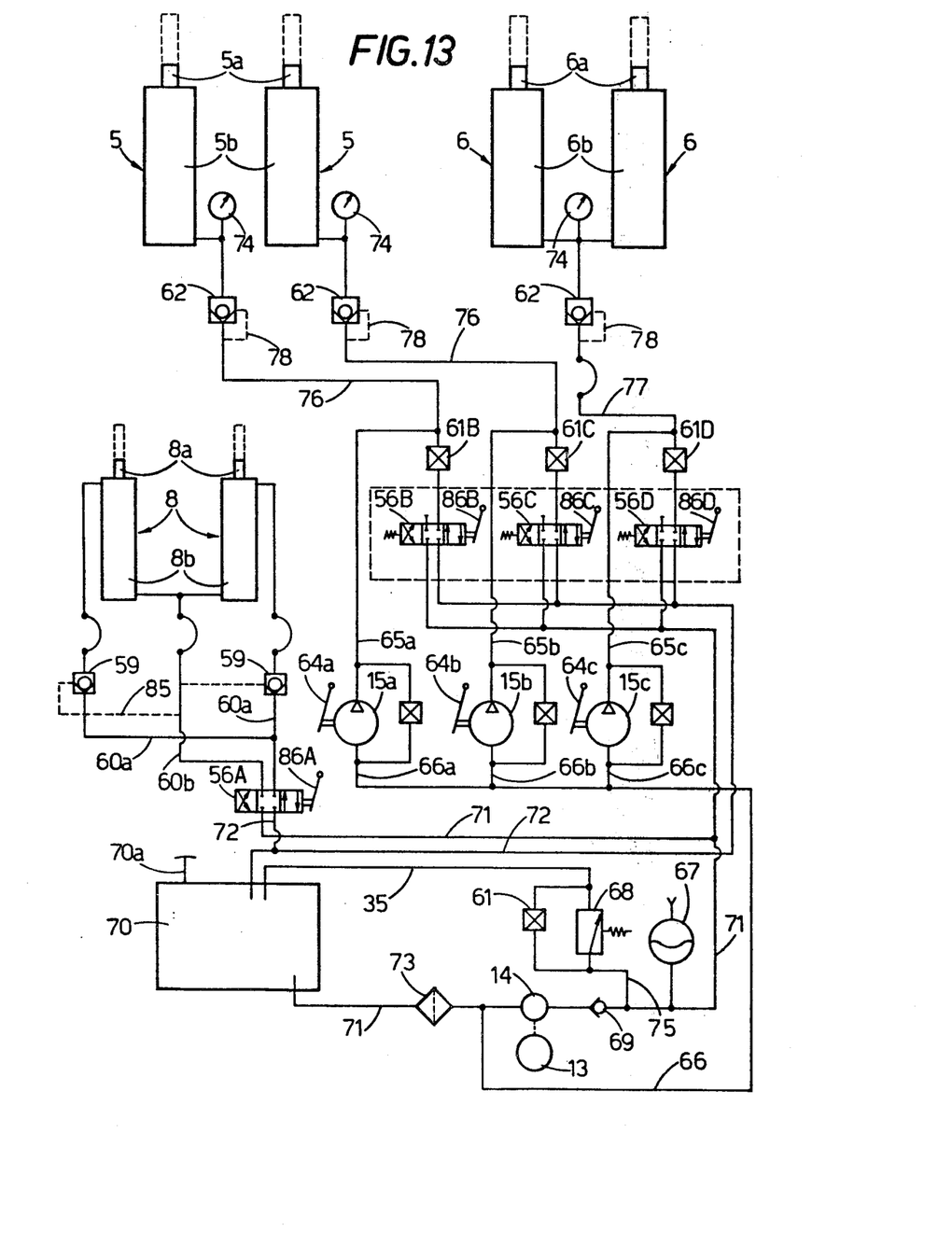
FIG. 13 shows the block diagram of the hydraulic system which supplies oil under pressure to the hydraulic cylinders of the positioner.
Figure 14:
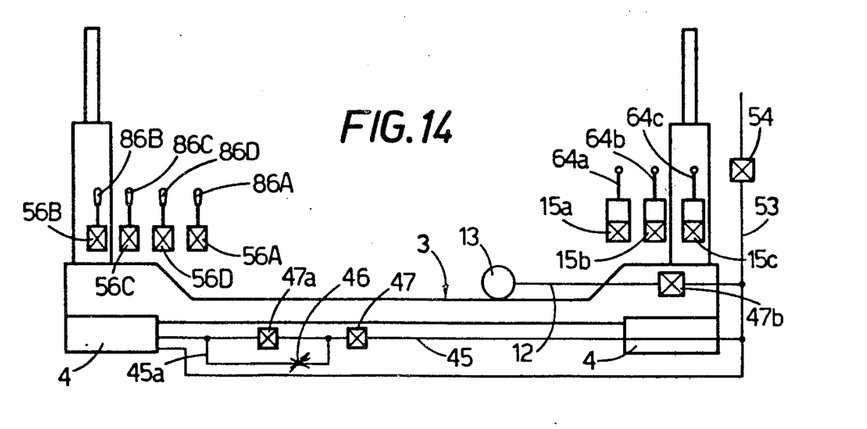
FIG. 14 shows diagrammatically the positions of the control levers mounted on the front head of the basic structure of the positioner.

In said FIG. 13 are diagrammatically represented the hydraulic cylinders or jacks 8 which are designed to cause the overturning of the rearward hydraulic cylinders or jacks 6 and to return then these latter up to their initial position. The hydraulic cylinders 8 which are of double-acting type, are alternately fed with oil supplied through the pipes 60a and 60b, the pipes 60a being provided with pilot check valves 59, respectively controlled by pressure in the pipe 60b. The pipes 60a, 60b through a three position two-way control valve 56A, controlled by a band control 86A mounted on the front head of the positioner 10 (FIG. 14), can selectively be put in communication, either with the oil delivery pipe 71 or with the oil return pipe 72 conveying the oil into the oil reservoir 70 which is provided with an oil charge orifice 70a closed by a removable capnut. In the pipe 71, which opens into the reservoir 70 near bottom are inserted in series filter 73 and an oil pump 14 driven by the compressed air motor 13, said pump 14 thus sucking oil from the reservoir 70 and forcing said oil in the hydraulic pipe system. After the pump 14 a check valve 69 is mounted, downstream of which a conduit 75 is branched off from the pipe 71, which is controlled by an over pressure valve 68 designed to permit any oil overflow which can be generated in the delivery pipe 71 to be deviated and returned into the reservoir 70. A pressure accumulator 67 is mounted downstream of the conduit 75 on an off-taken pipe, said pressure accumulator 67 being designed to compensate for any over pressure on the feeding oil system. The pipes 71 and 72 can be connected: through the three-position two-way valve 56A to the pipes 60a and 60b connected to the double-acting hydraulic cylinders 8; and through the three position two-way valves 56B, 56C and 56D respectively to the hydraulic cylinders 5 and 6, which are of a single-acting type. The pipes 76 and 77 are controlled by oil pressure gauges 74 and in said pipes 76 and 77 pressure piloted check valves 62 of known type permit a controlled return of the oil during the discharge phase of the hydraulic cylinders 5 and 6, so that the pipes 76 and 77 can act alternately as oil delivery, or return pipes under the control of the three-position two-way valves 56B, 56C and 56D, which can be actuated by the control levers 86B, 86C and 86D (FIGS. 13 and 14), the oil flow through the said pipes 76 and 77 being controlled by the needles valves 61B, 61C and 61D provided for allowing an oil flow adjustment. These latter valves are manually adjusted periodically so as to correctly balance the oil fed to the hydraulic cylinders 5 and 6 so as to secure their simultaneous raising when all the valves 56B, 56C and 56D are in the oil delivery position. Therefore when the overturning hydraulic cylinders 8 have to be made operative, the motor 13 is put in function, while the valves 56B, 56C and 56D by the hand levers 86A, 86B, 86C and 86D have been put in their inoperative position. It is to be noted that in the block diagram of FIG. 13, the piston rods 8a, 5a, 6a are supposed to be in their return limit position.

So as to permit the trailer 1 to be positioned just over the frame 7 of the positioner 10, the lever 86A will be actuated by turning in a counterclockwise direction according to FIG. 13, so that the hydraulic cylinders 8 during the forward stroke of their pistons cause the piston rods 8a to advance, thus causing the overturning of the hydraulic cylinders 6. After the trailer 1 has been placed just over the frame 7 of the positioner 10, the lever 86A is turned in a clockwise direction, so that the hydraulic cylinders 6 are brought again in their vertical position under the action of the hydraulic cylinders 8 which perform their return stroke so that the cylinders 6 are now ready to become operative.

Then the lever 86A is turned up to attain its central position, in which the valve 56A controlling the connection between the pipes 60a, 60b and the pipes 71, 72 is positioned in its inoperative position, as shown in FIG. 13. After having carried out all the maneuvres necessary for obtaining the correct positioning of the assembly 10,1 24 or 10,1,24 and 2 and after having duly adjusted the valves 61B, 61C, 61D, the levers 86B, 86C and 86D are shifted counterclockwise so as to allow that the pressurized oil to reach the hydraulic cylinders 5 and 6 in order to lift the assembly 1,7 until the trailer 1 is positioned at a short distance below the engine 2 be removed, or so that the assembly 7,1,2 is positioned at a short distance from the engine installation position. In this position the valves 56B, 56C, 56D are shifted in their inoperative position so as to allow the manually actuated pumps 15a, 15b, 15c to be put in action by actuating the control arms 64a, 64b and 64c respectively, so as to obtain a further slow lifting movement of the piston rods 5a and 6a of the hydraulic cylinders 5 and 6 so that the engine 2 docks the pylon and that the mounting bolt holes of the engine 2 are brought in register underneath the connection holes of the pylon in the case of the installation of the engine, or in the case of engine removal to carry the trailer 1 with the cradle 24, but without the engine 2, just underneath the engine 2. Said pumps 15a, 15b and 15c suck the oil from the reservoir 70 through a pipe 66 branched off from the pipe 71 downstream of the filter 73, said pipe 66 supplying the oil to the pipes 66a, 66b, 66c respectively, which by means of the respective pumps 15a, 15b, and 15c supply the oil to the hydraulic cylinders 5 and 6 through the pipes 65a, 65b and 65c, the pipes 65a and 65b being connected respectively to the pipes 76, and the pipe 65c being connected to the pipe 77 respectively, downstream of the valves 61B, 61C and 61D. Said hand pumps 15a, 15b and 15c permit the fine adjustment of the assembly (frame 7, trailer 1) with the cradle 24 carrying the engine 2 or without said engine 2, under the supervision of the operators mounted on the platforms 18 and which are placed in the best position so as to be able to assist in all the maneuvres and to reach the work positions for the removal or installation of the engine 2 and which can also control and co-ordinate all the maneuvres made by the operators working on the ground so as to obtain the perfect positioning of the engine 2 with respect to the holes designed to receive the mounting bolts, or from which the bolts have to be removed.

After said correct positioning of the assembly, the removal or installation operations of an engine 2 can be performed. As this task has been achieved the control levers 86B, 86C, 86D will be turned in clockwise direction to put the pipes 76 and 77 again in communication with the oil return pipe 72, so that the piston rods 5a and 6a can re-enter the cylinders 5b and 6b up to attain their lower limit position. Then the levers 86B, 86C and 86D are actuated so as to shift the valves 56B, 56C, 56D in their inoperative position, as shown in FIG. 13. Then air is supplied to the devices 4 so that the assembly 10,1,24 and 2 can be moved away from the engine removal area as far as any suitable distance is attained. Then the air supply to the devices 4 will be shut off so that the assembly 10,1,24 and 2 is lowered to the ground surface. Then the lever 86A is turned in counter clockwise direction in order to make operative the hydraulic cylinders 8 so that the advancing of their piston rods 8a has as a result that the rear cylinders 6 are overturned into contact to the ground. Later on the trailer 1 can be towed away from the positioning 10, said trailer 1 now carrying the removed engine 2. At last the lever 86A of the positioner 10 is turned clockwise so as to cause the rear hydraulic cylinders 6 to be lifted from the ground, afterwards the control lever 86A will be shifted up to its central position so that the three position valve 56A will be now returned in its inoperative position, so that the oil supply of the cylinders 8 will be cut. In this condition the positioner 10 can be towed by any suitable means to any parking area, ready for any further utilization.

It is to be noted that tests were carried out with the equipment of this invention for the removal or substitution of the engine No. 1 of an aeroplane a/m Alitalia (called I-Dine) with an operator team comprising only four engine mechanics, one electrical specialist and one foreman. The test yielded the following results:

Twelve hours of aeroplane down time for the engine change, in comparison with the fifteen hours required when the conventional apparatus and/or devices are used. In particular, without considering the work ground test the new engine, in the case of the engine installation, the operation time decreases from eight hours, when the work has been performed according the conventional methods, to five hours when the equipment of this invention is utilized.

A percentage safe manhour time of the 50% which corresponds in particular to a reduction of 20-25 hour/man of labour.

An increase of the level of the operators' safety, more in particular, with respect to the accessibility to the engine connection means.

A drastic reduction of the physical effort of the men utilized for lifting and moving the engine so as to achieve a better human efficiency.

I claim:

1. A hydro-pneumatic positioner for a wheeled trailer provided with a cradle for supporting or receiving a wing engine of an aircraft, to be used for the installation or removal of the engine of an aircraft, said positioner comprising: a basic structure underneath of which are fixed four air-cushion devices, and on which are mounted four hydraulic cylinders mounted on the corners thereof, said four cylinders including a front pair of cylinders and rear hydraulic cylinders, each being provided with a hoisting chain; and a frame suspended from said chains and adapted to receive and lift the trailer together with the cradle carrying the engine or without engine between a lowered and an elevated position, said lifting cylinders being designed to perform vertical operative strokes, the front pair of said cylinders being fixed to the basic structure, while the rear hydraulic cylinders are mounted on said structure so as to be able to be simultaneously brought and held in their vertical position, or be simultaneously tilted until they come into contact with the ground in substantial prosecution of the basic structure and vice versa, by a third pair of hydraulic cylinders; the central and rear portions of the positioner having a maximum width less than the inner facing surfaces of the wheels of the trailer, while the height of said central and rear portions of the positioner in the lowered position is less than the level of the distance between any lowermost part of the trailer placed between the wheels and the ground; said basic structure housing and/or supporting: a pneumatic circuitry and means for connecting said circuitry to an external source of compressed air, and for supplying said compressed air to the air cushion devices, as well as to an air driven motor driving a main oil rotary pump; an oil circuitry for supplying the oil to all the hydraulic cylinders, as well as to control, protection and adjusting means and to said main pump as well as to hand pumps for supplying the oil to the hydraulic cylinders and alternatively to the main pump.

2. A positioner according to claim 1, wherein the basic structure of the positioner consists of two longitudinal hollow beams, an intermediate rear cross hollow beam, and a front hollow beam which extends outwardly beyond the beams, the inner cavities of said beams communicating with each other and being airtight with respect to the atmosphere, so as to define an inner chamber of a predetermined volume which forms a reserve of compressed air inserted in the piping designed to supply compressed air to the air cushion devices.

3. A positioner according to claim 1, wherein the frame is formed by a structure comprising a pair of longitudinal beams having front and rear ends, said beams being spaced apart from one another so as to be able to be positioned each near one of the longitudinal outer sides of the beams of the basic structure, said beams being bridged by an intermediate rear traverse and by a front traverse, having end portions which extend outwardly beyond the beams, the projecting end portions of said traverses being provided with connections for anchoring one end of the chains of the front hydraulic cylinders, while on the rear ends of the beams connections are provided for the anchoring of one of the ends of the chains of the rear hydraulic cylinders.

4. A positioner according to claim 1, wherein the piston rods of the hydraulic cylinders are each connected at its outer end with a channel like cover in which transmission and guiding rollers for the chains are rotatably mounted; the chains of the front pair of cylinders moving in vertical planes parallel to the longitudinal direction of the positioner and being connected respectively at one of their ends to respective connections provided on the basic structure, and at the other of their ends to the cradle, while the chains of the rear hydraulic cylinders extend in a vertical plane transverse to the longitudinal direction of the positioner when the cylinders are in their vertical position, one of the ends of the respective chains is connected to a horizontal rod carried by the basic structure and which can rotate about its axis and which is fixedly connected with the bodies of the hydraulic cylinders, while the other of the ends of each of said chains is connected to the frame.

5. A positioner according to claim 1, wherein each cylinder of the third pair of hydraulic cylinders is pivotally connected to an outer end of a respective piston rod of one of the rear hydraulic cylinders, said rear cylinders being linked by means of horizontal transverse pins to the basic structure, so that the axes of said third pair of cylinders during the operative strokes thereof can rotate about the axes of the pivot pins, always remaining in vertical longitudinal planes.

6. A positioner according to claim 1, wherein the compressed air circuitry includes: a hose to be connected to an outer compressed air source and which supplies air to a main pipe, in which are inserted in series a main shut-off valve, an air pressure regulating valve, a filter, a device for lubricating the air, from said pipe being branched off a pipe for supplying the air to the devices provided to create air cushions below the basic structure, under the control of a set of pressure regulating valves, and adapted to maintain said basic structure together with what it carries, including the operators mounted on stepping platforms installed on the trailer, suspended at a predetermined distance from the ground.

7. A positioner according to claim 1, wherein the hydraulic system comprises an oil distribution network, comprising: an oil reservoir connected to a delivery pipe and a return pipe, said pipes being connected to the third pair of hydraulic cylinders through a three position two-way valve controlled by a hand lever and said pipes being provided with pilot check valves, while the front and rear hydraulic cylinders are connected to the pipes through three position two-way valves, said valves being controlled by hand levers respectively, said hydraulic cylinders being able to be fed, alternatively and in parallel, by hand pumps sucking oil from the reservoir through the pipes to the front and rear hydraulic cylinders downstream of the valves, said hand pumps being actuable by hand levers; said oil circuitry also including pilot check valves, pressure gauges, oil flow adjustment valves, a pressure accumulator, an over pressure regulating valve associated with an oil over flow regulating valve, and an oil filter.

* * * * *